June 17, 1969
W. SIMON
3,449,942
ISOPIESTIC CHROMATOGRAPHIC DETECTOR
Filed Aug. 18, 1966
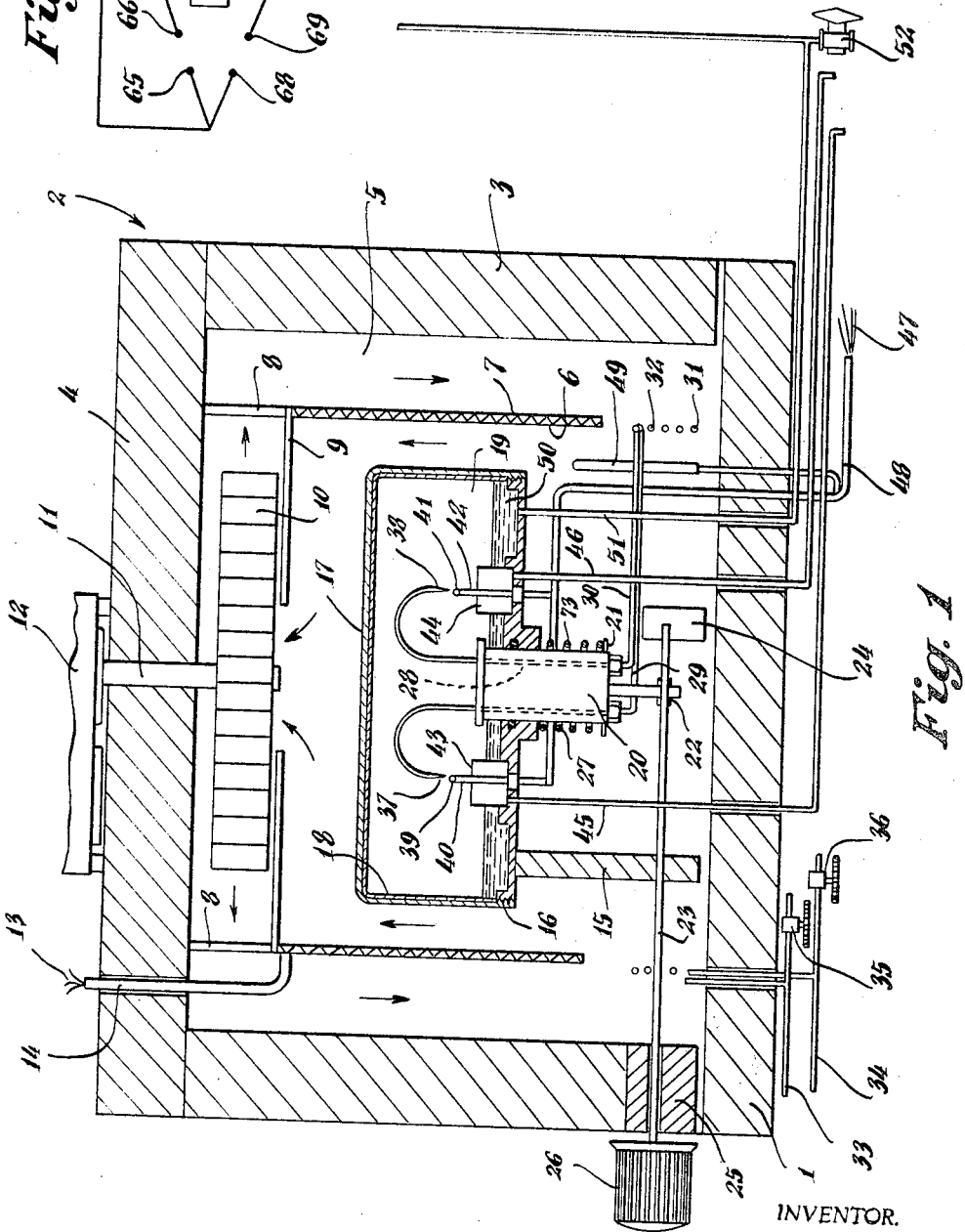
INVENTOR.
Wilhelm Simon United States Patent Office 3,449,942
Patented June 17, 1969

3,449,942
ISOPIESTIC CHROMATOGRAPHIC DETECTOR
Wilhelm Simon, Zurich, Switzerland, assignor to The Perkin-Elmer Corporation, Norwalk, Conn., a corporation of New York
Filed Aug. 18, 1966, Ser. No. 573,230
Int. Cl. G01n 11/00
U.S. Cl. 73—53                                    17 Claims

ABSTRACT OF THE DISCLOSURE

The molar concentration of a solution is monitored by flowing the solution in the form of a film over a thermal sensor of relatively low thermal mass in an isopiestic chamber and observing indications of variations in temperature of the thermal sensor.

---

If a drop of a solution of a nonvolatile compound and a drop of the solvent are suspended in a chamber saturated with the vapour of the solvent, a temperature difference is set up between the two drops. This effect is due to the presence of the solute which lowers the vapour pressure of the solution and accordingly vapour condenses on it. Hence the temperature of the solution rises while that of the solvent remains constant. The temperature difference attained depends on the molar concentration of the solution so that the value of the temperature difference provides certain information about the solute, for example the molecular weight if the concentration by weight is known.

In instruments working on this principle each drop has previously been suspended from a bead thermistor so that the temperature difference results in a difference of resistance between the two beads which can accordingly be measured by a bridge circuit. The chamber needs to be temperature controlled to fine limits and to contain a pool of solvent which may be spread over a large area by the use of absorbent material to promote rapid saturation of the atmosphere with solvent vapour.

It has now been found that the sensitivity of such an arrangement for detecting molar concentration is increased several times if the liquid is in the form of a film on the surface of the bead or other thermal sensor of low thermal mass, rather than in the form of a drop and in accordance with the present invention the molar concentration of a solution is continuously monitored by observing the response in terms of a parameter change caused by a temperature change of a thermal sensor of low thermal mass mounted within a thermostatically controlled isopiestic chamber, i.e., containing a constant vapour pressure of solvent, while the solution is caused to flow from an outlet over the surface of the sensor in the form of a film. The increased sensitivity renders the principle particularly applicable to liquid chromatographic analysis where the low flow rates involved require very sensitive instruments and in accordance with another feature of the invention at least a proportion of the effluent from a chromatographic column constitutes the solution. Under these conditions the resultant response of the thermal sensor depends on the molar concentration of the effluent as the sample constituents are eluted. In other words the response is in the form of a trace with a number of spaced peaks corresponding to the constituents of the sample thus giving a typical chromatogram.

Apparatus for continuously monitoring the molar concentration of a solution, and in accordance with the present invention, comprises a thermostatically controlled isopiestic chamber and a thermal sensor of low thermal mass mounted in the chamber at a distance beneath a solution outlet in such a way that the flow of solution from the outlet over the sensor is in the form of a film. This apparatus or detector as it will be termed may form a self-contained unit and the solution outlet can be connected to the effluent outlet of the liquid chromatographic column if the detector is to be used for chromatographic analysis. In some cases only a small proportion of the column effluent will be passed through the detector and accordingly a proportioning device may be interposed between the column outlet and the detector inlet for varying this proportion.

The thermal sensor is preferably the actual bead of a bead thermistor, the thermal mass of which is of course quite small, in which case the output from such a detector is in the form of a resistance variation and the bead may be connected to a device responsive to resistance change. The resistance variation is substantially proportional to the temperature change caused by the changing effluent concentration. The bead thermistor resistance can be compared with that of a standard resistor in a bridge circuit which is used to control a chart recorder to produce a chromatogram.

In some situations however, it may be preferable to provide a reference in the form of a second bead thermistor or other thermal sensor located within the chamber so that a lesser degree of temperature control is necessary. In this case it is convenient to allow carrier liquid as used in the column to flow over the bead also in the form of a film. The responses of both thermal sensors are then compared to give a difference signal. In addition to the application to chromatography, this arrangement may be used to compare the concentrations of two liquid streams; for example, streams sampled before and after any device which causes a change in concentration.

Preferably the detector includes an adjustment mechanism whereby the vertical separation of the thermal sensor or sensors and the outlet can be adjusted until the flow of solution from the outlet over the sensor is in the form of a film and the response of the detector is near optimum. This adjustment enables the molar concentration of a range of solutions with widely differing physical characteristics to be monitored.

As has been stated the term "isopiestic chamber" means a chamber containing a constant vapour pressure of solvent. In fact the isopiestic chamber is preferably saturated with the solvent vapour and this in general requires the presence of a pool of solvent therein. It is important that this should not be contaminated by the effluent during the period of operation. This can be avoided by the provision of some means located below the thermal sensor or sensors which collect and remove the effluent from the chamber.

For a clearer understanding of the invention reference will now be made to the accompanying drawing in which:

FIGURE 1 is a schematic sectional elevation of a detector in accordance with this invention;

FIGURE 2 is a standard bridge circuit used for temperature measuring purposes in this invention.

The detector is generally cylindrical and is formed in two parts which can be separated to gain access to the interior, for instance for cleaning purposes. One of these parts has a circular base-plate 1 made of a thermally insulating material. The other part indicated generally as 2 has a cylindrical wall 3 which is secured to a circular plate 4, both of which are also made of a thermally insulating material. The two parts are held together by a retaining device (not shown) and define a thermally insulated chamber 5.

A cylindrical electrical heating element 6 is wound on a cylindrical former 7 which is supported by a number of supports 8 attached to the plate 4. The heating element is energized through leads 13 which pass through a conduit 14 to the exterior of the detector. A thin circular plate 9 with a circular central aperture is secured to the top of the former 7. A fan impeller 10 secured to a driving shaft 11 is located immediately above the plate 9 and is rotated by an electric motor 12 mounted on the plate 4. Rotation of the impeller causes a circulation of air within the chamber 5 as will be described later.

The plate 1 carries three pillars 15 (only one of which is visible) made of a thermally insulating material such as Teflon (registered trademark). The pillars support a circular base-block 16 which has a screw thread around its periphery. A generally domed-shaped cover 17 carrying a cooperating screw thread is screwed to the base-block 16 to define a chamber 19 within the chamber 5. The inner surface of the cover 17 is lined with absorbent material 18 which may for instance be an absorbent paper and a pool 50 of a solvent constituting a liquid reservoir covers the base-block 16. The solvent is the same as that used in the liquid chromatographic column (not shown) as the carrier liquid and is introduced into the chamber 19 through a pipe 51 under the control of a cock 52 which enables the level of the pool to be adjusted. The pipe 51 is also used for draining the solvent from the chamber 19.

The base-block 16 defines a control aperture in which a generally cylindrical member 20 slides in a vertical direction. A compression spring 73 encircles the member 20 between the base-block 16 and a collar 21 secured to the member 20, and has the effect of biasing the member towards its lowest position. The underside of the member 20 contacts a cam 22 which is secured to a rotatable shaft 23 journalled at one end in a bearing-block 24. The latter is carried by the base-plate 1 as is a second bearing-block 25 in which the other end of the shaft 23 is journaled. A knob 26 is secured to the end of the shaft which can therefore be rotated to adjust the vertical position of the member 20 through the effect of the cam 22.

A pair of tubes 27 and 28 extend through and are secured to the cylindrical member 20. The lower ends of the tubes are connected by flexible lengths of tubing 29 and 30 respectively to respective identical cylindrical coils of capillary tubing 31 and 32 which have several turns and are supported by the base-plate 1. The flexible lengths of tubing 29 and 30 are required to permit the vertical movement of the member 20 and the tubes 27 and 28. The coils 31 and 32 extend from the chamber 5 and are connected into respective pipes 33 and 34 in which respective cocks 35 and 36 are located. The pipe 33 is connected to the effluent outlet of the liquid chromatographic column and the pipe 34 is connected to a source (not shown) of the same solvent which constitutes the pool 50 and which is also used as the carrier liquid in the column.

The tubes 27 and 28 are each turned through a semicircle at their upper ends and terminate in respective tapered outlets 37 and 38 within the chamber 19. These outlets are each located vertically above the actual temperature detecting beads of respective bead thermistors which are mounted in an upright position in the base-block 16. The beads have their sensitive surfaces uppermost and have a relatively low thermal capacity. The outlet 37 is located vertically above the temperature detecting bead 39 of a glass shrouded thermistor probe 40 and the outlet 38 is located vertically above the temperature detecting bead 41 of a glass shrouded thermistor probe 42. The bead 41 of the latter thermistor serves as a reference as will become apparent later. The beads 39 and 41 are supported from below by the glass bodies of the respective probes and are surrounded by respective circular funnels 43 and 44 which collect any liquid flowing from the outlets over the thermistor bead surfaces and thus prevent it from mixing with and, in the case of the column effluent, contaminating the pool 50.

The funnels 43 and 44 are connected by respective pipes 45 and 46 to the exterior of the detector so that any liquid which flows over the thermistors 40 and 42 is rapidly removed from the chamber 19. As the liquid which flows over the reference bead 41 is, in the present example, the same as the solvent which forms the pool 50 the funnel 41 could be dispensed with. If it were necessary to keep the pool level substantially constant an overflow system could be provided.

In detectors which are only to be operated for short periods it may be possible to also eliminate the funnel 43 as well as the funnel 41 and allow the effluent to flow into the pool of solvent. Care must be taken however to avoid appreciable contamination of the solvent as this would affect the accuracy of measurements as will become apparent.

The extension leads 47 of the thermistor beads 39 and 41 pass through a duct 48 to the exterior of the apparatus where they are connected to recording apparatus. The extension leads of the detecting bead 39 are connected to terminals 65 and 66 in one arm of a bridge circuit shown generally as 67 in FIG. 2. The extension leads of the detecting bead 41 are connected to terminals 68 and 69 in another arm of the bridge circuit 67. This circuit is provided with a standard resistor 70 and an adjustable resistor 71 for manually balancing the bridge before monitoring commences. A constant voltage DC supply is placed across two extremes of the bridge as shown and a chart recorder 72 across the other extremes.

In addition to carrying the extension leads of the thermistor detecting beads the duct 48 also carries leads from a temperature sensing element 49 which senses the temperature at a particular location in the chamber 5.

The detector is prepared for use by switching on the heating element 6 and the motor 12 for a sufficient length of time to enable steady state conditions to be reached within the chamber 19. The rotating fan impeller 10 causes a circulation of air within the thermally insulated chamber 5. The air is drawn upwardly in the space between the heating element 6 and the cover 17 and is then drawn towards the center of the impeller 10 and then outwardly and downwardly between the wall 3 and the heating element 6. During its upward and downward movement the air passes adjacent the heating element 6 and is thus heated. The heat is transmitted through the cover 17 and the base-block 16 to the chamber 19. The temperature of the air is sensed by the element 49 which is connected to a thermostat (not shown). Eventually the desired temperature is reached and this is maintained by the thermostat so that the chamber 5 and the chamber 19 within it are thermostatically controlled.

The chamber 19 is isopiestic in that once steady state temperature conditions have been reached the amount of solvent vapour in the chamber remains constant. The effect of the absorbent material 18 is to promote evaporation of the solvent and in general when steady state conditions have been reached the chamber 19 is saturated with the solvent vapour.

When these conditions are reached the resistance of the temperature detecting beads 39 and 41 becomes stable. The chromatographic analysis of a sample is then begun in the normal manner by passing the carrier liquid containing the sample through the liquid chromatographic column. It will be appreciated that this is a continuous process as is the flow of some of the column effluent over the thermistor bead 39 and the flow of solvent over the thermistor bead 41 which will now be described, the detector thus being particularly suited to liquid chromatography.

A very small proportion of the effluent from the column is fed through the capillary coil 31 while the remainder flows away through the cock 35. The length of the coil 31 is such that for the range of flow rates for which the detector is designed, the effluent is brought to a constant temperature and preferably to the temperature which exists at the outlet 37 before the effluent itself issues from this outlet. As has been stated the outlet is directly above the thermistor bead 39 and the vertical separation can be adjusted by means of the knob 26.

While the effluent flows through the coil 31 and issues from the outlet 37, a similar quantity of solvent is passed through the capillary coil 32 and issues from the outlet 38 which is directly above the thermistor bead 41. The solvent flows through the coil 32 and is thus brought to the same temperature as that of the effluent.

The manner in which the effluent issues from the outlet 37 and flows over the thermistor bead 39 as well as the manner in which the solvent issues from the outlet 38 and flows over the thermistor bead 41 depends to some extent on the flow rate, the effluent and solvent viscosities and their surface tensions. However, in general these latter two characteristics are substantially identical as only very small traces of the sample are present in the effluent and the flow rates can, of course, be made equal. Accordingly, the separation between the two outlets and their respective thermistor beads can be the same as is illustrated.

In order to obtain accurate measurements it is essential that the effluent and the solvent flow smoothly over the surfaces of the respective beads in the form of films. The sensitive upper surfaces of the beads should thus be covered by a continuous film of effluent or solvent respectively and it is generally necessary that a continuous liquid surface extends from the outlets down to their respective beads so as to avoid the formation of drops as this gives rise to momentary fluctuations and results in an erratic trace on the chart recorder 72. There is thus for most solvents an optimum separation between the outlets and their respective beads. If the detector is designed for use only with this solvent or one having similar physical characteristics then the outlets and beads can be fixed in relation to one another. However, it is preferable that their separation should be adjustable and to this end an adjustment mechanism is preferably provided as in the present example so that the separation can be adjusted prior to any analysis until the effluent and solvent flow from the outlets over the beads in the manner just mentioned.

This adjustment can be made by passing the effluent and solvent over their respective beads and adjusting the knob 26 until the maximum response is obtained on the chart recorder 72, that is to say the maximum temperature difference.

It is also important that the effluent and solvent should flow smoothly off their bead surfaces onto the glass shrouds forming part of the thermistor probes. The liquids then flow down the sides of the shrouds and this contributes to the smooth flow over the bead surfaces. After collection in the funnels 43 and 44 the liquids are removed from the chamber 19 through the pipes 45 and 46.

The chamber 19 is saturated with the vapour of the solvent while the effluent issuing from the outlet 37 consists of the solvent together with traces of the sample under analysis. The effluent therefore has a lower vapour pressure than the solvent, the actual pressure difference being dependent on the quantity and the molecular weight of the sample constituents. This difference in vapour pressure results in solvent vapour condensing on the surface of the effluent, the temperature of which therefore increases. As the effluent forms a film over the surface of the bead 39 this increase in temperature is detected by the bead 39 and upsets the state of balance of the bridge circuit 67. The low thermal capacity of the beads results in a quick response. The bead 41 of the reference thermistor 42 has the solvent flowing over it and thus serves as a reference against which temperature variations of the bead 39 are compared.

Equilibrium is reached when the vapour pressures of the effluent and solvent become equal. The temperature difference between the thermistor bead 39 and the reference thermistor bead 41 which then exists indicates the molar concentration of the sample constituents on the thermistor bead 39 at that time and by adjusting the bridge circuit so that it is balanced, a record of the temperature difference is obtained. The flow of effluent and solvent over their respective beads is of course continuous and the chart recorder may be used to give a trace of the temperature variation with time. This results in the production of a typical chromatographic trace with a number of spaced peaks corresponding to the passage of the individual constituents over the thermistor bead 39. It should be noted that the peaks are measured relative to their base line rather than in absolute terms.

It is important that excessive effluent flow rates should be avoided as they will prevent thermal equilibrium being established and reduce the sensitivity of the detector. In fact preferably very low rates are used, for instance of the order of 6 cm.$^3$/hour.

The detector which has been described may be modified in many different ways. For instance the reference thermistor 42 which serves only to measure the temperature of the solvent can be eliminated if the thermostatic control system is sufficiently good for fluctuations not to mask the variations being observed. The reference thermistor 42 may thus be replaced by a standard resistor connected in the bridge circuit 67 between the terminals 65 and 66.

Alternatively, a different solvent to that which is used as the carrier liquid may be passed over the bead 41 of the reference thermistor. In this case, the detector acts in a differential sense. Such an arrangement can be used with a chromatograph having two columns, the effluent from one flowing over the bead thermistor 39 and the other containing solvent and flowing over the bead thermistor 41. This arrangement can compensate for changes in impurity level in the column effluents which can take place if the column temperature is varied.

As the temperature difference set up is dependent on molar concentration, consequently the integral of the curve constituted by the trace of the recorder is a measure of the total number of moles present. If a second detector is used for the same column which responds to the refractive index of the effluent the reading of this second detector is dependent on the density of the effluent and consequently the integral of the curve constituted by the trace of the recorder is a measure of the total mass of solute present. Accordingly, by correlation of the two readings, i.e., the total number of moles and the total mass, the molecular weights corresponding to the various peaks may be derived so as to help identify the constituents of the sample.

I claim:
1. A method of continuously monitoring the molar concentration of a solution comprising:
 flowing the solution in the form of a film over a thermal sensor of low thermal mass mounted within a thermostatically controlled isopiestic chamber, and observing the response of the sensor to said flow of solution.
2. A method of liquid chromatographic analysis comprising:
 flowing a portion of an effluent from a chromatographic column in the form of a thin film over a thermal sensor of low thermal mass mounted within a thermostatically controlled isopiestic chamber, and observing the response of the sensor to said flow of effluent.
3. The method according to claim 1 including flowing a fluid in a thin film over a second thermal sensor of low thermal mass located within the chamber and continuously comparing the response of the second sensor with that of the first thermal sensor and displaying an indication of the resulting difference.
4. The method according to claim 3 including flowing a solvent from an outlet over the surface of the second sensor in the form of a film.

5. A method according to claim 3 wherein the solution flowed over said first sensor comprises a portion of the effluent from a chromatographic column and the fluid flowed over said sensor comprises a portion of the effluent from a second chromatographic column.

6. Apparatus for continuously monitoring the molar concentration of a liquid solution, comprising a thermostatically controlled isopiestic chamber, a liquid solution outlet positioned in the chamber, and a thermal sensor of low thermal mass positioned in the chamber beneath said outlet and spaced therefrom by a distance for providing that the flow of solution from the outlet over the sensor is in the form of a film.

7. Apparatus according to claim 6 in which the thermal sensor comprises a bead thermistor supported from below.

8. Apparatus according to claim 6 in which a second thermal sensor of low thermal mass is mounted in the chamber.

9. Apparatus according to claim 8 including a second outlet and in which the second thermal sensor is positioned beneath the second outlet and is spaced therefrom by a distance for providing that the flow of solution from the outlet over the sensor is in the form of a film.

10. Apparatus for continuously monitoring the molar concentration of a solution, comprising a thermostatically controlled isopiestic chamber, a solution outlet mounted in the chamber, a thermal sensor of low thermal mass mounted in the chamber beneath the solution outlet and spaced therefrom, an adjustable means for varying the spacing between sensor and outlet for providing that the flow of solution from the outlet over the sensor is in the form of a film.

11. Apparatus according to claim 10 in which a second thermal sensor of low thermal mass is mounted in the chamber.

12. Apparatus according to claim 11 including a second liquid outlet positioned within the chamber and in which said second thermal sensor is positioned beneath said second liquid outlet and said adjustable means is adapted for varying the spacing between said second thermal sensor and said second liquid outlet for providing that the flow of liquid therefrom over the sensor occurs in the form of a film.

13. Apparatus according to claim 6 in which a funnel is provided for collecting liquid flowing over the sensor and a conduit is connected to the funnel for conveying the liquid from the chamber.

14. Apparatus according to claim 6 including an elongated pipe positioned in a manner for being heated to approximately the temperature of the chamber and adapted for conveying liquid to said outlet.

15. Apparatus according to claim 14 in which the elongated pipe is formed of coiled capillary tubing.

16. A method of continuously monitoring the molar concentration of a solution comprising:
flowing the solution in the form of a film over a thermal sensor of low thermal mass mounted within a thermostatically controlled isopiestic chamber;
generating an electrical signal which is representative of temperature variations occurring at said sensor in response to the flow of said solution; and
providing a display of said electrical indication.

17. The method of claim 16 wherein the provision of a display includes the step of recording the electrical representations.

References Cited
UNITED STATES PATENTS

| | | | |
|---|---|---|---|
| 3,018,655 | 1/1962 | Cogniat | 73—27 |
| 3,091,957 | 6/1963 | Hampton | 73—27 |
| 3,097,518 | 7/1963 | Taylor et al. | 73—27 X |
| 3,134,257 | 5/1964 | Reinecke | 73—27 |
| 3,184,953 | 5/1965 | Petrocelli | 73—27 X |

LOUIS R. PRINCE, *Primary Examiner.*

J. W. ROSKOS, *Assistant Examiner.*

U.S. Cl. X.R.

73—27, 61.1